United States Patent [19]
Miyashita et al.

[11] Patent Number: 5,411,000
[45] Date of Patent: May 2, 1995

[54] IGNITION TIMING CONTROL SYSTEM FOR INTERNAL COMBUSTION ENGINE

[75] Inventors: Yukio Miyashita; Hiroshi Yatani; Tatsuya Ito, all of Saitama, Japan

[73] Assignee: Honda Giken Kogyo Kabushiki Kaisha, Tokyo, Japan

[21] Appl. No.: 176,444

[22] Filed: Jan. 3, 1994

[30] Foreign Application Priority Data

Jan. 13, 1993 [JP] Japan .................. 5-020498

[51] Int. Cl.$^6$ ............................. F02P 5/152
[52] U.S. Cl. .................................... 123/425
[58] Field of Search .............. 123/416, 417, 419, 422, 123/423, 425

[56] References Cited

U.S. PATENT DOCUMENTS

| | | | |
|---|---|---|---|
| 4,376,429 | 3/1983 | Youngblood | 123/425 |
| 4,489,692 | 12/1984 | Haraguchi et al. | 123/419 |
| 4,646,522 | 3/1987 | Mamiya et al. | 123/425 |
| 4,727,841 | 3/1988 | Hirose et al. | 123/425 |
| 4,848,299 | 7/1988 | Satoh et al. | 123/425 |
| 4,899,282 | 2/1990 | Holmes | 123/425 |
| 5,000,150 | 3/1991 | Miyama et al. | 123/425 |
| 5,168,853 | 12/1992 | Kitteison et al. | 123/419 |

FOREIGN PATENT DOCUMENTS

| | | |
|---|---|---|
| 1-178736 | 7/1989 | Japan . |
| 2-64263 | 3/1990 | Japan . |
| 2-36787 | 8/1990 | Japan . |
| 5-57336 | 7/1993 | Japan . |
| 5-57363 | 7/1993 | Japan . |

Primary Examiner—Willis R. Wolfe
Attorney, Agent, or Firm—Nikaido, Marmelstein, Murray & Oram

[57] ABSTRACT

Ignition timing control system for internal combustion engines. The system comprises a means for detecting operating parameters of the engine such as engine speed, engine load, the presence of knock, a means for determining a basic ignition timing on the basis of the engine speed and load, a means for determining a first group of retard amounts based on the detected operating parameters to prevent knock from occurring, and a means for determining a second group of retard amounts based on the detected operating parameters to intentionally reduce output torque of the engine. The first retard amount group is compared with the second one the basic ignition timing is corrected by the selected value. With the arrangement, the retard amount is limited to the minimum required even when engine operating conditions producing knock and requiring engine output reduction are present at the same time.

11 Claims, 5 Drawing Sheets

IGNITION TIMING CONTROL SYSTEM FOR INTERNAL COMBUSTION ENGINE

BACKGROUND OF THE INVENTION

1. Field of the Invention

This invention relates to an ignition timing control system for internal combustion engines, and more particularly to a system for deciding the amount of ignition timing retard adjustment in an internal combustion engine.

2. Description of the Prior Art

In conventional internal combustion engine ignition timing control a basic ignition timing is calculated from the engine speed, load and the like, an adjustment amount is calculated based on the engine coolant temperature, the intake air temperature, the presence/absence of knock etc., and the adjustment amount is added to the basic ignition timing to obtain the final ignition point. For example, Japanese Patent Publication No. 2(1990)-36787 teaches a system in which occurrence of knock is prevented by retarding the ignition timing when the engine coolant temperature is higher than a prescribed value. On the other hand, as can be seen in Japanese Laid-open Patent Publication No. 2(1990)-64263, for example, systems have recently been proposed for enhancing vehicle performance by retarding the ignition timing so as to reduce engine output torque.

However, since the prior art internal combustion engine ignition timing control separately calculates the retard adjustment amount for avoiding knock and the retard adjustment amount for reducing engine output torque, the amount of retard adjustment becomes excessive and the performance of the vehicle is degraded when an engine operating condition producing knock and an engine operating condition requiring engine output reduction are present at the same time.

SUMMARY OF THE INVENTION

In view of the foregoing, an object of the present invention is to overcome the aforesaid problem by providing an ignition timing control system for internal combustion engines which prevents degradation of vehicle performance by limiting the amount of retard adjustment to the minimum required even when an engine operating condition producing knock and an engine operating condition requiring engine output reduction are present at the same time.

This invention achieves this object by providing a system for controlling ignition timing of an internal combustion engine, comprising first means for detecting operating parameters of the engine, second means for determining a basic ignition timing on the basis of at least one of the detected operating parameters, third means for determining a first retard amount based on at least one of the detected operating parameters to prevent knock from occurring, fourth means for determining a second retard amount based on at least one of the detected operating parameters to intentionally reduce output torque of the engine, fifth means for comparing the first retard amount with the second retard amount, sixth means for selecting one of the first and second retard amounts, which is greater in a retard direction, to correct the basic ignition timing, and seventh means for finally determining a final ignition timing to be supplied to the engine at least on the basis of the corrected basic ignition timing.

BRIEF EXPLANATION OF THE DRAWINGS

This and other objects and advantages of the invention will be more apparent from the following description and drawings, in which.

DETAILED DESCRIPTION OF THE PREFERRED EMBODIMENTS

An embodiment of the invention will now be explained with reference to the drawings.

Figure 1:
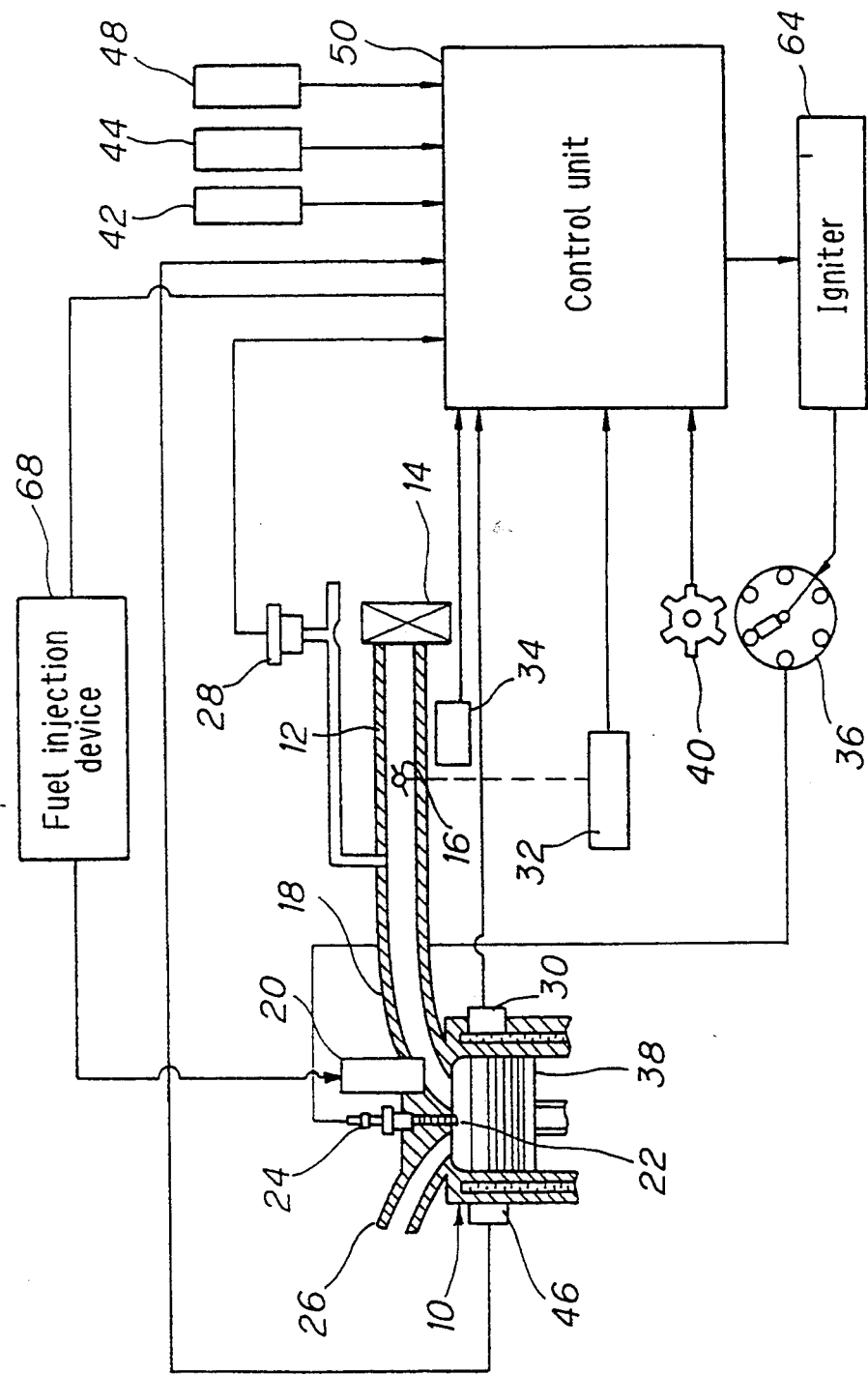
FIG. 1 is an overall schematic view showing an ignition timing control system for an internal combustion engine according to the invention.

FIG. 1 is an overall schematic view of an internal combustion engine ignition timing control system according to this invention. Reference numeral 10 in this figure designates a multi-cylinder (six-cylinder) internal combustion engine for powering a vehicle. Air drawn in through an air cleaner 14 mounted on the far end of an air intake passage 12 passes into an intake manifold 18 formed integrally with the intake passage 12 while the flow thereof is adjusted by a throttle valve 16. An injector 20 for injecting fuel is installed in the vicinity of the intake port (not shown) of each cylinder (only one shown). The injected fuel mixes with the intake air and the mixture is drawn into the associated cylinder when the intake valve (not shown) opens. In the combustion chamber 22, the air-fuel mixture is ignited by a spark plug 24. The exhaust gas produced by the combustion is discharged through an exhaust port (not shown) into an exhaust manifold 26 when the exhaust valve (not shown) opens, from where it passes through an exhaust pipe (not shown) to a catalytic converter (not shown) where it is removed of noxious components before being discharged to the exterior.

The air intake passage 12 is equipped with a manifold absolute pressure sensor 28 which senses the absolute pressure of the intake air at an appropriate point downstream of the throttle valve 16 so as to enable detection of the engine load. In addition, a water temperature sensor 30 is installed in the vicinity of a coolant passage of the internal combustion engine 10 for sensing the temperature of the engine coolant, a throttle position sensor 32 is installed in the air intake passage 12 at a point near the throttle valve 16 for sensing the degree of opening of the throttle valve 16, and an intake air temperature sensor 34 is provided for sensing the temperature of the intake air. A crank angle sensor 40 consisting of a pulser that rotates synchronously with the rotation of a crankshaft (not shown) rotated by the reciprocal motion of pistons 38 and a pickup member (not shown) disposed opposite the pulser is provided inside an ignition distributor 36 located near the internal combustion engine 10. The crank angle sensor 40 outputs a pulse signal once every prescribed degree of change in the crank angle.

A driven wheel speed sensor 42 is provided in the vicinity of each driven wheel (not shown) driven by the internal combustion engine 10 mounted in the vehicle and a free wheel speed sensor 44 is provided in the vicinity of each free wheel (not shown). The driven wheel speed sensors 42 and the free wheel speed sensors 44 (only one of each shown) detect the rotational speeds of the associated wheels. A piezoelectric knock sensor 46 is mounted at an appropriate position on the cylinder block of the internal combustion engine 10 for sensing vibration caused by knock produced in the cylinders. Further, a vehicle speed sensor 48 comprising a reed switch is provided in the vicinity of the drive shaft (not shown) of the vehicle powered by the internal combustion engine 10 for detecting the traveling speed of the vehicle. The outputs of the manifold absolute pressure sensor 28 and the other sensors 30, 32, 34, 40, 42, 44, 46 and 48 are sent to a control unit 50.

Figure 2:
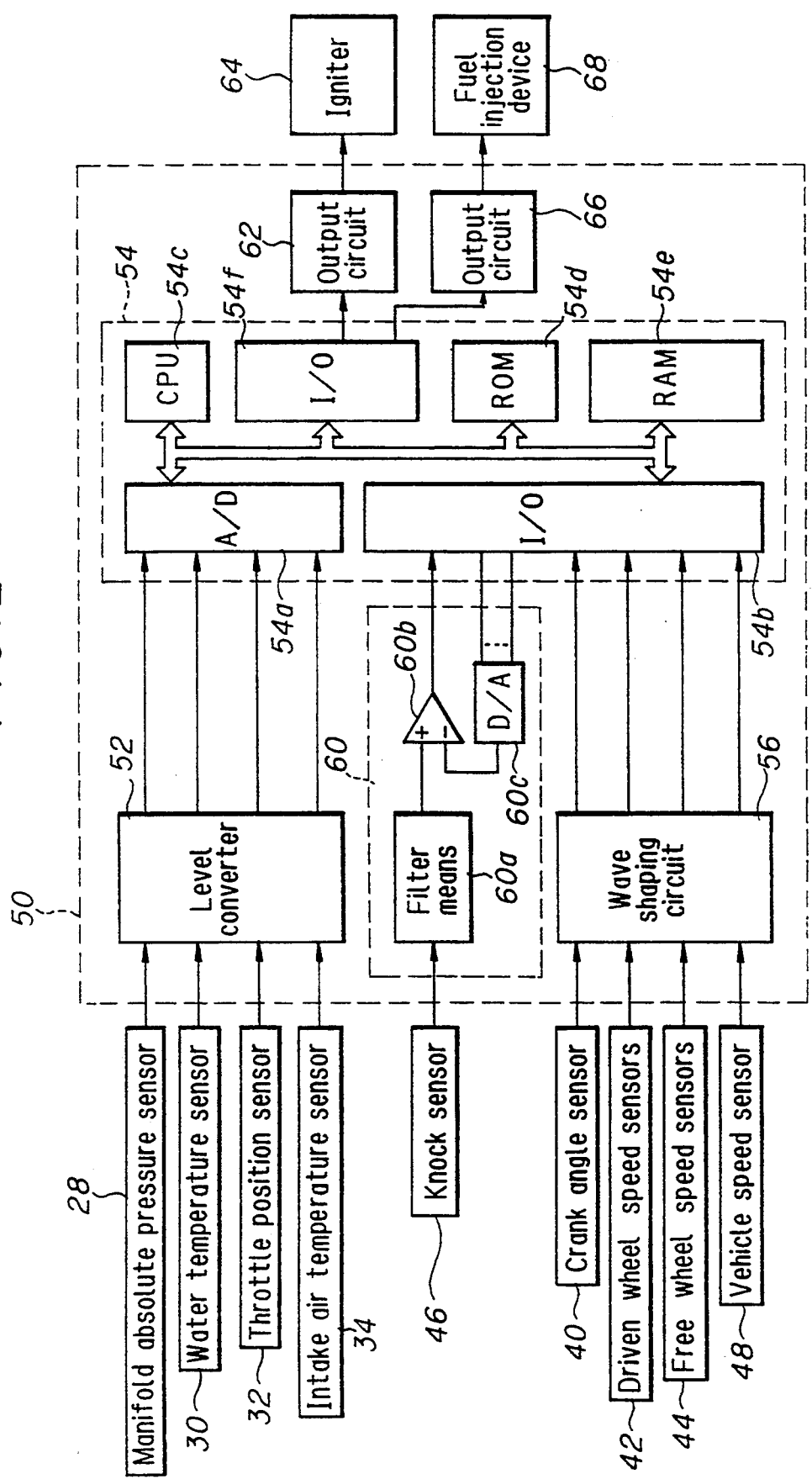
FIG. 2 is a block diagram showing the details of a control unit illustrated in FIG. 1.

The arrangement of the control unit 50 is illustrated in FIG. 2. The analog outputs from the manifold absolute pressure sensor 28 etc. are input to a level converter 52 in the control unit 50 for adjustment to a prescribed level and are then forwarded to a microcomputer 54. The microcomputer 54 comprises an A-D converter 54a, I/O (input/output) circuits 54b, 54f, a CPU (central processing unit) 54c, a ROM (read-only memory) 54d and a RAM (random access memory) 54e. The signals output by the level converter 52 are converted to digital values by the A-D converter 54a in accordance with commands from the CPU 54c and are then temporarily stored in the RAM 54e. The digital outputs of the crank angle sensor 40 etc. are shaped in a wave shaping circuit 56 and then input to the microcomputer 54 through the I/O circuit 54b.

After being sent to the control unit 50, the output from the knock sensor 46 is input to a knock detection circuit 60. The knock detection circuit 60 comprises a filter means 60a, a comparator means 60b and a D/A conversion means 60c. The comparator means 60b compares a reference value (discrimination level) received from the microcomputer 54 through the D/A conversion means 60c with the sensor output value received through the filter means 60a and outputs a pulse each time that the sensor output level exceeds the reference value (discrimination level). The microcomputer 54 counts the number of pulses output and, based on the count, discriminates whether or not knock occurred.

As will be explained further later, in the aforesaid configuration the CPU 54c of the microcomputer 54 calculates a basic ignition timing from the outputs of the crank angle sensor 40 and the manifold absolute pressure sensor 28, determines the final ignition timing by adjusting the basic ignition timing in light of the presence/absence of knock and other factors and issues an ignition command through the I/O circuit 54f and an output circuit 62 to an ignition device 64 constituted as an igniter or the like, thus producing a spark in the spark plug 24 of the cylinder selected by the ignition distributor 36 and igniting the air-fuel mixture in the cylinder.

The CPU 54c in the microcomputer 54 also calculates the slip ratio (driven wheel speed-free wheel speed)/free wheel speed from the outputs of the driven wheel speed sensors 42 and the free wheel speed sensors 44 and when it determines that the driven wheel slip has exceeded a prescribed level, conducts traction control for reducing the engine output in accordance with the slip state. This control can be achieved by adjusting either the ignition timing or the fuel supply. The microcomputer 54 determines a control value for one of these control modes and, if it is for adjusting the ignition timing, outputs it to the igniter 64 via the I/O circuit 54f and the output circuit 62, while if it is for adjusting the fuel supply (is a fuel injection amount control value), outputs it through a second output circuit 66 to a fuel injection device 68 so as to control the supply of fuel through the injector 20. (This traction control will not be discussed further here since the present invention is not directed to the traction control itself and, moreover, information regarding such control can be found in the assignee's Japanese Utility Model Application No. 3(1991)-113269 (filed on Dec. 27, 1991 and corresponding to Japanese Laid-Open Utility Model Publication No. 5(1993)-57336).

Further, when the CPU 54c of the microcomputer 54 detects rapid acceleration of the vehicle from the throttle valve opening, it conducts control to suppress vehicle body swaying vibration caused by torque fluctuation phase lag during acceleration by retarding the ignition timing based on the vehicle speed, engine speed etc., thus reducing the engine output torque. (This control is explained in the assignee's earlier Utility Model Application No. 3(1991)-113270 (filed on Dec. 27, 1991 and corresponding to Japanese Laid-Open Utility Model Publication No. 5(1993)-57363) and will not be discussed further here.)

In addition, the CPU 54c of the microcomputer 54 monitors the state of an automatic transmission (not shown) and when it finds that gear shift is in progress, conducts control to reduce engine output torque by retarding the ignition timing and the like, thereby eliminating the unpleasant sensation that would otherwise be experienced by the passengers during gear shift. (As this control is explained in, for example, the assignee's earlier Laid-open Patent Publication No. 1(1989)-178736, it will not be discussed further here.)

The operation of the system will now be explained with reference to the flow chart of FIG. 3.

First, in S10, the basic ignition timing IGMAP is determined. This is done by retrieval from a map stored in the ROM 54d using the engine speed and the manifold absolute pressure as address data. (In this specification, a "map" is lookup tables from which data is retrieved using two operation parameters while a "table" is a lookup table from which data is retrieved using a single operation parameter.)

The program then passes to S12 in which the ignition timing adjustment amount is determined. The flow chart of FIG. 4 shows a sub-routine for making this determination.

Figure 4:
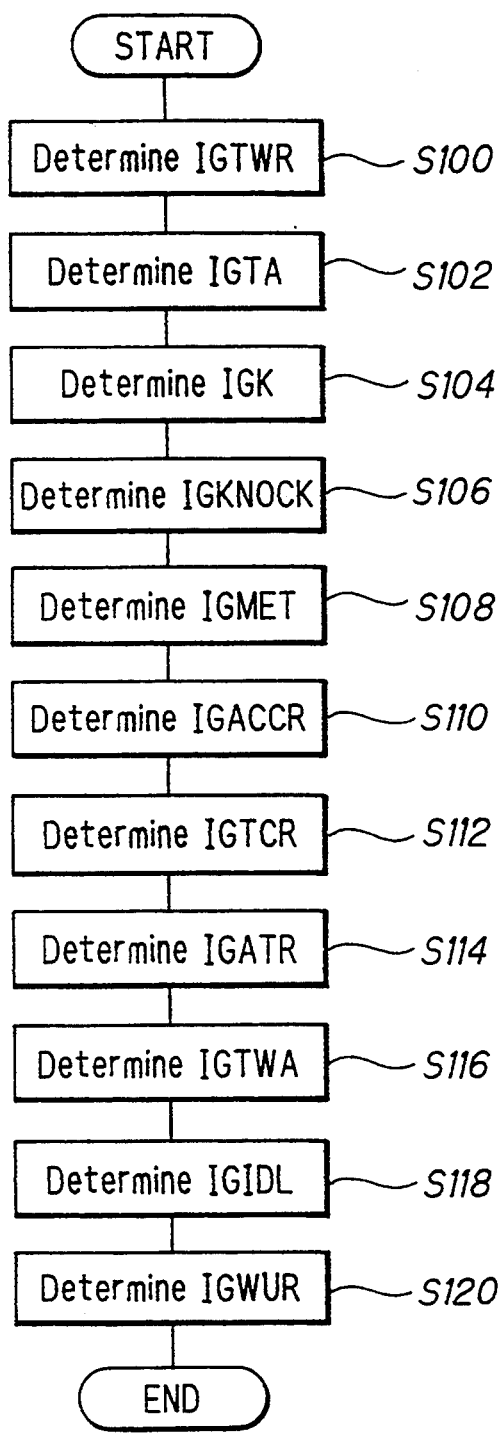
FIG. 4 is a flow chart showing a subroutine of the flow chart of FIG. 3 for determining adjustment amounts of the ignition timing.

In the first step S100 of FIG. 4 an adjustment amount (retard amount) IGTWR is determined. This is for retarding the ignition timing to prevent knock when the engine coolant temperature is high. The determination is made in another subroutine (not shown) by using the engine coolant temperature to retrieve the adjustment amount IGTWR from a prescribed table. (When the anticipated operating condition is nonexistent, the adjustment amount is set to zero (no adjustment). The same applies to the other adjustment amounts referred to in the following.)

The program then passes to S102 in which an adjustment amount (retard amount) IGTA is determined. This determination is made in another subroutine (not shown) by using the intake air temperature to retrieve the adjustment amount IGTA from a prescribed table and the retrieved value is used to retard the ignition timing to prevent knock when the intake air temperature exceeds a prescribed value. Next, an adjustment amount (retard amount) IGK is determined in S104. This determination is made in another subroutine (not shown) for retarding the ignition timing for preventing knock during an operating condition in which the vehicle makes a rapid drive-away from around engine idling speed.

The program then passes to S106 in which an adjustment amount (retard amount) IGKNOCK is determined. This determination is made in another subroutine (not shown) for retarding the ignition timing when it is found from the output of the knock detection circuit 60 that knock has occurred and for thereafter advancing the ignition timing by the amount that it was retarded when it is found that knocking has ceased. The adjustments in S100 to S106 are for avoiding the occurrence of knock.

Next, in S108, an adjustment amount (retard amount) IGMET is determined. This adjustment is for reducing the engine output torque for preventing body vibration (noise). In a multi-cylinder internal combustion engine, for example, in the six-cylinder internal combustion engine of the present embodiment, the inertial force received by the flywheel differs depending on the positional relationship of the attachment of the piston to the crankshaft so that the crankshaft oscillates at the attachment position of a specific cylinder, giving rise to an impact on the metal bearing and producing vibration (slapping). Another subroutine (not shown) is therefore used to detect operating conditions requiring relatively little engine output torque, as during vehicle cruising, and the ignition timing of the specific cylinder is retarded to decrease the output torque and thus reduce vibration (slapping).

The program then passes to S110 in which an adjustment amount (retard amount) IGACCR is determined. This adjustment is also for reducing engine output torque so as to reduce the earlier discussed swaying vibration that occurs in the vehicle body during acceleration. Rapid acceleration operating condition is detected by another subroutine (not shown) and, when prescribed conditions are present, the ignition timing is retarded when, for example, the engine speed increases and is returned in the advance direction by the amount of the retard adjustment when the engine speed decreases, whereby engine output torque fluctuation is smoothed.

The program next passes to S112 in which an adjustment amount (retard amount) IGTCR is determined. This adjustment is implemented when it is determined in another subroutine (not shown) that traction control is to be conducted through ignition timing control and is for retarding the ignition timing in accordance with the slip state when prescribed conditions are present. Then, in S114, an adjustment amount (retard amount) IGATR is determined. This adjustment is for retarding the ignition timing to reduce engine output torque when prescribed conditions are present at the time another subroutine (not shown) finds that gear shift is in progress. The adjustments in S108 to S114 are for reducing engine output torque.

The program then passes to S116 in which an adjustment amount (advance amount) IGTWA is determined. This is what is generally called a "cold advance" adjustment and is for advancing the ignition timing to make a cold engine easier to start. It is implemented when another subroutine (not shown) finds that the engine is being started cold. The program then advances to S118 in which an adjustment amount (advance/retard) amount IGIDL is decided. This adjustment is implemented when another subroutine (not shown) finds that the engine speed is in the idling range and prescribed conditions are present, and is for advancing or retarding the ignition timing for converging the engine speed on the target idling speed.

The program then passes to S120 in which an adjustment amount (retard amount) IGWUR is determined. This adjustment is implemented when another subroutine (not shown) finds that the engine is warming up and prescribed conditions are met, and is for retarding the ignition timing so as to increase the exhaust temperature and promote activation of the catalytic converter.

Figure 3:
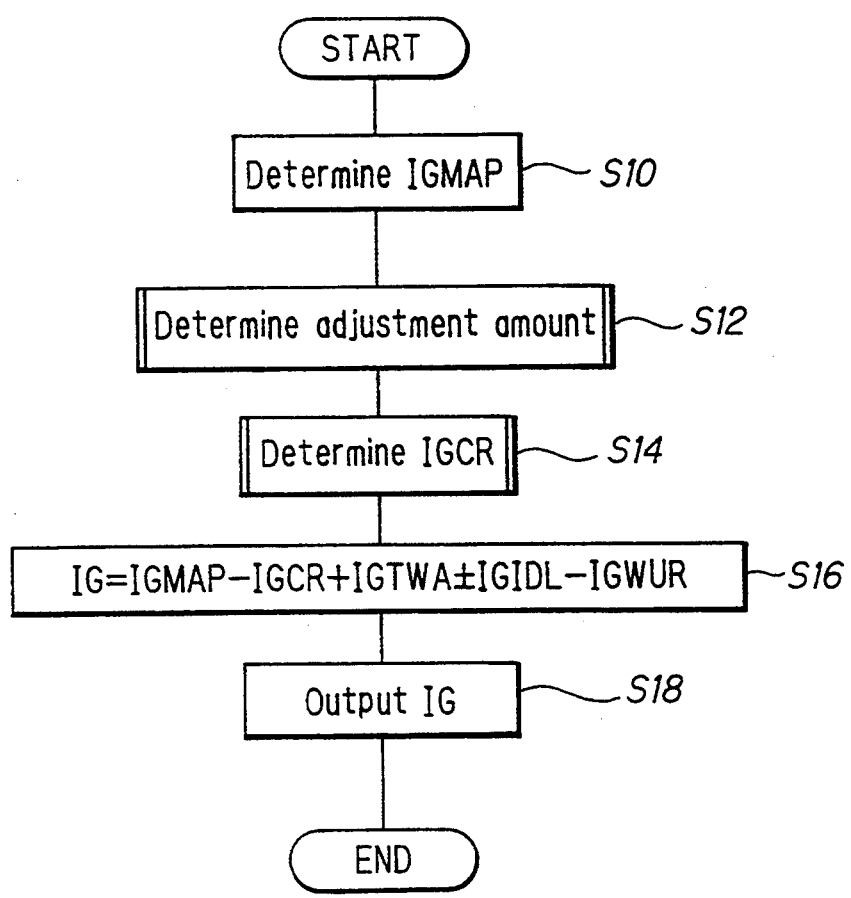
FIG. 3 is a flow chart showing the main routine of the control unit.

It should be noted here that the aforesaid adjustment values are prepared in tables as positive values, except for the adjustment amount IGIDL, and are forcibly changed their signs from positive to negative at the time of determining the final ignition timing at S16 in the flow chart of FIG. 3.

The program next passes to S14 of the flow chart of FIG. 3, which determines a group value IGCR on the basis of a comparison of the aforesaid adjustment values related to knock avoidance and those related to engine output torque.

Figure 5:
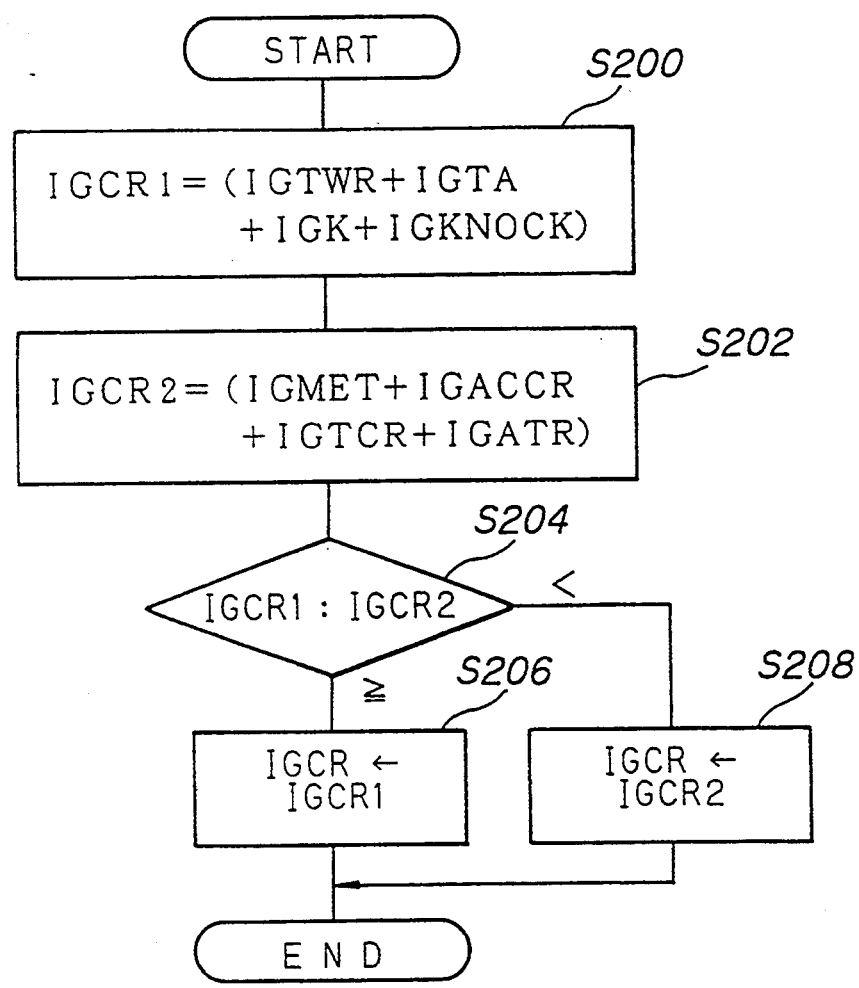
FIG. 5 is a flow chart showing a subroutine of the flow chart of FIG. 3 for determining a group value IGCR for knock avoidance and engine output torque reduction.

A subroutine for making this determination is shown in FIG. 5. First, in S200, those among the aforesaid adjustment values that relate to knock avoidance, namely, the adjustment values IGTWR, IGTA, IGK and IGKNOCK, are added up and the sum is designated as group value IGCR1, and then, in S202, those that relate to engine output torque, namely, IGMET, IGACCR, IGTCR and IGATR are added up and the sum is designated IGCR2. The program then passes to S204 in which the sums IGCR1 and IGCR2 are compared. If sum IGCR1 is found to be equal to or greater than IGCR2 the program goes to S206 in which IGCR1 is defined as the group value IGCR. Otherwise the program passes to S208 in which IGCR2 is defined as the group value IGCR.

The program then passes to S16 of the flow chart of FIG. 3, in which the basic ignition timing IGMAP, the group value IGCR and the remaining adjustment amount group (i.e., the group of adjustment values not directly related to either knock avoidance or output torque reduction) are summed to obtain the final ignition timing IG, and finally to S18 in which the final ignition timing is output at a prescribed crank angle. It will be understood that since the operating regions on which the adjustment amounts of FIG. 4 are premised are not necessarily identical, the individual adjustment amounts frequently have zero value (no adjustment amount). It should also be noted that in FIG. 3, a minus sign (−) indicates an adjustment in the retard direction, a plus sign (+) indicates an adjustment in the advance direction, and a plus-or-minus sign (±) indicates that the direction of the adjustment depends on an operating condition.

Being configured in the aforesaid manner, the present embodiment ensures that the vehicle performance is not degraded by excessive retard-adjustment of the ignition timing under operating conditions in which a knock avoidance adjustment amount and an engine output torque reduction adjustment amount are present at the same time. More specifically, when the knock avoidance adjustment amount summation value IGCR1 and the engine output torque reduction amount summation value IGCR2 are both present, retarding the ignition timing on the basis of the knock avoidance adjustment amount summation value IGCR1 automatically reduces the engine output torque at the same time while, similarly, retarding the ignition timing on the basis of the engine output torque reduction amount summation value IGCR2 automatically prevents knock at the same time. In this invention, therefore, the two summation values are compared and the larger (in terms of retard adjustment amount) is selected and used. Since use of the larger eliminates the need for the smaller, the adjustment amount becomes the minimum one required.

Adjustment amounts that are not included in either of the summation values IGCR1 and IGCR2 are established for different purposes than these summation values and are used only in special engine operating regions such as during cold engine start. Since they therefore do not overlap either of the summation values IGCR1 and IGCR2, they are treated separately.

Although in the description of the aforesaid embodiment IGTWR, IGTA and various other adjustment amounts are listed for incorporation in one or the other of IGCR1 and IGCR2, it is alternatively possible to appropriately select only certain of the adjustment amounts for incorporation. On the other hand, it is also possible to incorporate other adjustment amounts related to knock avoidance and engine torque output reduction but not referred to in the foregoing into the appropriate one of the summation values.

Moreover IGACCR, IGTCR, IGATR and the other adjustment amounts need not necessarily be calculated by the methods described in connection with the foregoing embodiment but can be calculated by any other methods suitable to the purpose of knock prevention or engine output torque reduction.

Further, the adjustments do not have to be in the form of amounts as in the aforesaid embodiment but can instead be in the form of coefficients by which the basic ignition timing or the like is multiplied.

The present invention has thus been shown and described with reference to specific embodiments. However, it should be noted that the present invention is in no way limited to the details of the described arrangements but changes and modifications may be made without departing from the scope of the appended claims.

What is claimed is:

1. A system for controlling ignition timing of an internal combustion engine, comprising:

first means for detecting operating parameters of the engine;

second means for determining a basic ignition timing on the basis of at least one of the detected operating parameters;

third means for determining a first retard amount based on at least one of the detected operating parameters to prevent knock from occurring;

fourth means for determining a second retard amount based on at least one of the detected operating parameters to intentionally reduce output torque of the engine;

fifth means for comparing the first retard amount with the second retard amount;

sixth means for selecting one of the first and second retard amounts, which is greater in a retard direction, to correct the basic ignition timing; and seventh means for finally determining a final ignition timing to be supplied to the engine at least on the basis of the corrected basic ignition timing.

2. A system according to claim 1, wherein the first retard amount comprises of a plurality of retard amounts to prevent the knock from occurring.

3. A system according to claim 2, wherein the plurality of retard amounts at least include a retard amount determined when engine coolant temperature is higher than a predetermined temperature.

4. A system according to claim 2, wherein the plurality of retard amounts at least include a retard amount determined when intake air temperature is higher than a prescribed temperature.

5. A system according to claim 2, wherein the plurality of retard amounts at least include a retard amount determined when a vehicle on which the engine is mounted drives away rapidly from around engine idling speed.

6. A system according to claim 1, the second retard amount comprises of a plurality of retard amounts to intentionally reduce output torque of the engine.

7. A system according to claim 6, wherein the plurality of retard amounts at least include a retard amount determined to reduce piston slapping.

8. A system according to claim 6, wherein the plurality of retard amounts at least include a retard amount determined to reduce swaying vibration of a body of a vehicle on which the engine is mounted.

9. A system according to claim 6, wherein the plurality of retard amounts at least include a retard amount determined when a driven wheel of a vehicle on which the engine is mounted slips by a rate greater than a predetermined rate.

10. A system according to claim 6, wherein the plurality of retard amounts at least include a retard amount determined when gear shift is in progress.

11. A system according to claim 1, further including: eighth means for determining an additional correction amount and said seventh means determines the final ignition timing from the corrected ignition timing and the additional correction amount.

* * * * *